(12) United States Patent  
Hirsch et al.

(10) Patent No.: US 8,509,846 B2
(45) Date of Patent: Aug. 13, 2013

(54) METHOD AND SYSTEM FOR MESSAGE TRANSMISSION AND RECEPTION

(71) Applicant: QUALCOMM Incorporated, San Diego, CA (US)

(72) Inventors: Olaf Hirsch, Sunnyvale, CA (US); Paul J. Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/705,119

(22) Filed: Dec. 4, 2012

(65) Prior Publication Data

US 2013/0095883 A1 Apr. 18, 2013

Related U.S. Application Data

(62) Division of application No. 13/398,713, filed on Feb. 16, 2012, now Pat. No. 8,335,536, which is a division of application No. 12/245,592, filed on Oct. 3, 2008, now Pat. No. 8,145,264.

(60) Provisional application No. 61/049,282, filed on Apr. 30, 2008.

(51) Int. Cl.
*H04W 88/06* (2009.01)
*H04J 3/16* (2006.01)

(52) U.S. Cl.
USPC .............. 455/553.1; 455/552.1; 370/466; 375/260

(58) Field of Classification Search
USPC .............. 455/552.1, 553.1; 370/464–468
See application file for complete search history.

(56) References Cited

U.S. PATENT DOCUMENTS

| | | | |
|---|---|---|---|
| 7,590,432 B2 | 9/2009 | Behzad et al. | |
| 8,145,264 B1 | 3/2012 | Hirsch et al. | |
| 8,335,536 B2 | 12/2012 | Hirsch et al. | |
| 2001/0005368 A1* | 6/2001 | Rune | 370/390 |
| 2002/0151325 A1* | 10/2002 | Fitton et al. | 455/553 |
| 2003/0096576 A1 | 5/2003 | Salonidis et al. | |
| 2005/0020299 A1 | 1/2005 | Malone et al. | |
| 2005/0025182 A1 | 2/2005 | Nazari | |
| 2006/0052125 A1* | 3/2006 | Falck et al. | 455/517 |
| 2007/0197256 A1 | 8/2007 | Lu et al. | |
| 2008/0279291 A1* | 11/2008 | Hassan et al. | 375/260 |
| 2009/0124200 A1 | 5/2009 | Hall et al. | |

* cited by examiner

*Primary Examiner* — Gennadiy Tsvey
(74) *Attorney, Agent, or Firm* — Bever, Hoffman & Harms, LLP

(57) ABSTRACT

Wireless devices may contain multiple radio transceivers, each conforming to different communication protocols. A first transceiver conforming to a first communication protocol in a first wireless device may be able to receive, detect, and/or decode messages transmitted by a second transceiver in a second wireless device conforming to a second communication protocol. The first transceiver may communicate received, detected, and/or decoded information to a different transceiver in the same first wireless device, thus enabling the collocated transceivers to work in concert efficiently. A wideband transceiver using a set of multiple sub-channels in parallel may receive, detect, and/or decode messages transmitted by a narrowband transceiver using a set of multiple channels serially, thereby reducing scan time and power consumption.

25 Claims, 6 Drawing Sheets

METHOD AND SYSTEM FOR MESSAGE TRANSMISSION AND RECEPTION

RELATED APPLICATIONS

This application is a Divisional of U.S. patent application Ser. No. 13/398,713 entitled "Method And System For Message Transmission And Reception" filed Feb. 16, 2012 which is a Divisional of U.S. patent application Ser. No. 12/245,592 entitled: "Method And System For Message Transmission And Reception" filed Oct. 3, 2008 which claims priority of U.S. Provisional Patent Application 61/049,282, entitled "WLAN Assisted Bluetooth Inquiry And Paging" filed Apr. 30, 2008.

BACKGROUND OF THE INVENTION

1. Field of the Invention

Embodiments of the present invention generally relate to wireless communication systems, and more particularly to wireless personal area networking and wireless local area networking.

2. Description of the Related Art

Wireless communication systems transfer data from a transmitting station to one or more receiving stations using modulated radio frequency (RF) signals. Bluetooth™ systems are wireless communication systems governed, in part, by the Bluetooth™ Special Interest Group (SIG) which publishes specifications and compliance standards. Current Bluetooth™ devices that follow the Bluetooth™ standards, up to version 2.1, use an inquiry scan procedure to discover new devices and a page scan procedure to connect to connectable devices. The inquiry scan and page scan procedures may take many seconds to complete because a Bluetooth™ transceiver listens for the inquiry and page messages across a series of relatively narrow radio frequency channels, while a Bluetooth™ transceiver transmits on a potentially different series of narrow radio frequency channels. Wireless local area networking (WLAN) devices are generally governed by the specifications and rules specified by the IEEE 802.11 working group. The IEEE 802.11b, 802.11g and 802.11n wireless local area networking standards provide exemplary wider bandwidth transmission methods that may use the same radio frequency band as Bluetooth™ standards. Portable electronic devices such as laptop computers, personal digital assistants and cellular telephones may incorporate hardware to support multiple wireless standards in the same device.

Both the Bluetooth™ and IEEE 802.11b/g/n wireless standards may use the unlicensed industrial scientific medical (ISM) frequency band from about 2.4 GHz to 2.5 GHz including guard bands at the upper and lower boundaries. Bluetooth™ physical layer radio channels may frequency hop among a set of 79 different 1 MHz wide radio frequency channels, while an IEEE 802.11 physical layer radio channel may occupy a 20 MHz or 40 MHz contiguous frequency band. As Bluetooth™ devices may be designed for low power consumption, reducing the time required to complete an inquiry or page procedure may reduce power consumed also.

Thus, there exists a need for a wireless radio reception method that uses a wider bandwidth transceiver in combination with a wide or narrow bandwidth transceiver to shorten the discovery and connect procedures thereby conserving energy within a wireless communication system.

SUMMARY OF THE INVENTION

Wireless devices may contain multiple radio transceivers, each conforming to different communication protocols. A first transceiver conforming to a first communication protocol in a first wireless device may be able to receive, detect, and/or decode messages transmitted by a second transceiver in a second wireless device conforming to a second communication protocol. The first transceiver may communicate received, detected, and/or decoded information to a different transceiver in the same first wireless device, thus enabling the collocated transceivers to work in concert efficiently. A wideband transceiver using a set of multiple sub-channels in parallel may receive, detect, and/or decode messages transmitted by a narrowband transceiver using a set of multiple channels serially, thereby reducing scan time and power consumption.

DETAILED DESCRIPTION

Figure 1:
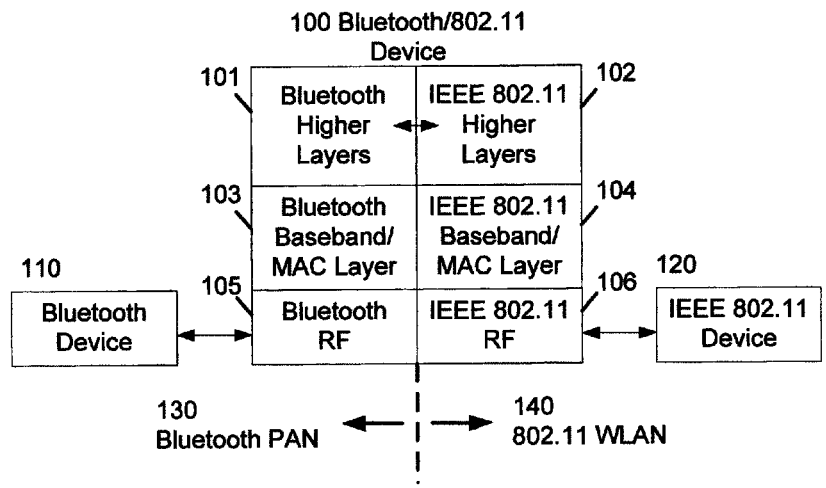
FIG. 1 illustrates a prior art dual radio communication device operating on two wireless networks.

Electronic devices may include both a Bluetooth™ transceiver and an IEEE 802.11 transceiver. A wider bandwidth transceiver, such as an IEEE 802.11 transceiver, may listen for Bluetooth™ transmissions across a range of frequencies simultaneously and may shorten inquiry and page scan procedures that establish and maintain connections in a Bluetooth™ network. An IEEE 802.11 radio transceiver may listen to many Bluetooth™ 1 MHz wide radio frequency channels simultaneously, thus increasing the probability of detecting an inquiry or page message successfully in a shorter time than a Bluetooth™ radio transceiver that listens to only a single 1 MHz wide radio frequency channel at a time.

A Bluetooth™ piconet may consist of a master device and multiple slave devices. Although master and slave roles may not be defined prior to the establishment of a connection in the Bluetooth™ piconet, an inquiring device may be referred to as the master device, while an inquiry scanning device may be referred to as the slave device. The Bluetooth™ master device may periodically transmit inquiry messages containing a general or dedicated inquiry access code by modulating a series of 32 carrier frequencies distributed over a set of 79 possible carrier frequencies spaced 1 MHz apart in the ISM band. For inquiry scan, the set of 32 frequencies and their frequency hopping sequence may be selected based on a calculation using a general inquiry access code (GIAC). Each inquiry message may consist of 68 bits transmitted at a rate of 1 Mbit per second within a single 1 MHz frequency channel and may occupy 68 micro-seconds of a 312.5 micro-second transmit interval, i.e. half of a 625 micro-second time slot. The inquiry message may be repeated within a second, different 1 MHz frequency channel in a succeeding 312.5 micro-second transmit interval. An inquiry frequency hopping sequence may determine the succession of frequencies on which the master device may transmit the inquiry messages. Bluetooth™ systems may use a time division duplex transmission method alternating between transmit time slots used for master to slave communication and receive time slots used for slave to master communication. The inquiry message may be sent repeatedly on a sequential train of 16 different frequencies during a series of transmit timeslots, cycling through the set of 16 frequencies 256 times for a total duration of 1.28 seconds. The Bluetooth™ master device may then send the inquiry message on a different train of 16 frequencies chosen from the set of 32 possible frequencies during each subsequent 1.28 second interval.

A Bluetooth™ slave device may listen (scan) for an inquiry message transmitted within a single 1 MHz frequency channel during an inquiry scan window of 11.25 msec out of an inquiry scan interval of 1.28 seconds. During the 18 consecutive 625 micro-second time slots spanning the inquiry scan window of 11.25 msec, the Bluetooth™ master may transmit within up to 16 different frequencies channels; however, the Bluetooth™ slave may listen on one of the 16 frequencies not transmitted out of the 32 possible frequencies. During each succeeding inquiry scan window, the Bluetooth™ slave may listen on a different 1 MHz frequency channel following an inquiry scan frequency hopping sequence. Eventually, the Bluetooth™ slave may listen to one of the frequency channels when the Bluetooth™ master may transmit an inquiry message on the same frequency channel; however, multiple successive inquiry scan intervals may occur thereby extending the time for the scan procedure to complete. A benefit of the invention is to reduce the time for the scan procedure by using a transceiver that listens to multiple 1 MHz frequency channels simultaneously increasing the likelihood of observing the Bluetooth™ master device's transmitted inquiry message.

FIG. 1 illustrates a wireless communication system including three wireless devices, a first device including two wireless transceivers using two communication protocols, a second wireless device including a wireless transceiver using one of the two communication protocols and a third wireless device including a wireless transceiver using the other of the two communication protocols. More specifically, FIG. 1 provides an exemplary architecture for a dual radio communication device 100 including a Bluetooth™ transceiver (blocks 101, 103, 105) and an IEEE 802.11 transceiver (blocks 102, 104, 106). The blocks 101-106 may represent the functions associated with the layers in the standard OSI seven layer communications protocol stack. Communication between blocks vertically, i.e. between a given layer and the next higher or lower layer, while not indicated explicitly in FIG. 1, may exist for the communication protocol stack to function. The dual radio device 100 may include an IEEE 802.11 WLAN radio frequency (RF) block 106 and a Bluetooth™ RF block 105 that transmit and receive separate signals from an IEEE 802.11 device 120 and a Bluetooth™ device 110 respectively. The dual radio device 100 may communicate on two parallel communication networks, a Bluetooth™ personal area network (PAN) 130 and an IEEE 802.11 wireless local area network (WLAN) 140. Limited communication between the Bluetooth™ and IEEE 802.11 transceivers within the dual radio communication device 100 may seek to minimize interference between transmissions on the Bluetooth™ PAN 130 and transmissions on the IEEE 802.11 WLAN 140. For example, the Bluetooth™ higher layer 101 and the IEEE 802.11 higher layer 102 in the dual radio communication device 100 may communicate with each other to coordinate transmissions on the Bluetooth™ PAN 130 and the IEEE 802.11 WLAN 140 to minimize overlapping frequencies or to share by time division a set of overlapping frequencies. Alternatively, without communication between them, the Bluetooth™ and 802.11 transceivers may each examine one or more frequency bands prior to transmitting to avoid frequencies used by the other system's transceiver. For any of these techniques, one transceiver may treat the transmissions of the other transceiver as "noise" to ignore rather than as an information carrying "signal" to decode. The present invention recognizes that an IEEE 802.11 transceiver may be able to detect and decode a Bluetooth™ inquiry or page message quicker than a Bluetooth™ transceiver, and a dual radio device may benefit as a result.

Figure 2:
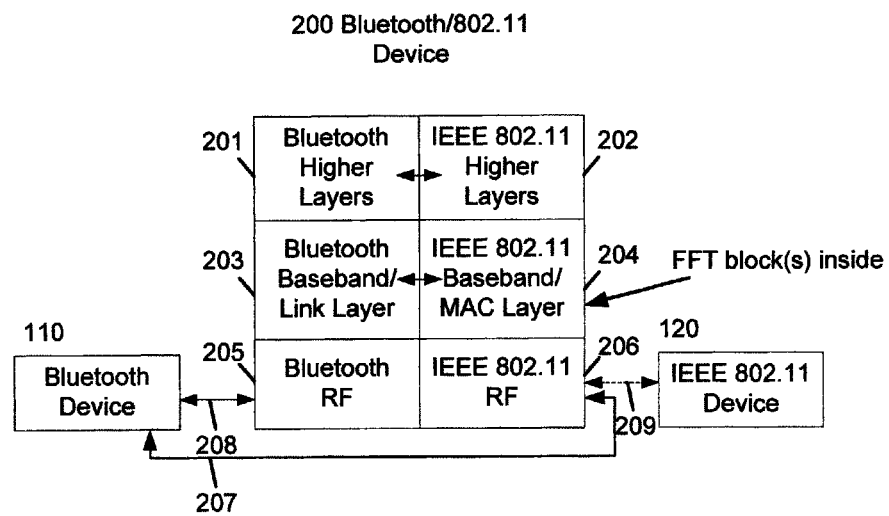
FIG. 2 illustrates a dual wireless radio device receiving signals from a Bluetooth™ device through an IEEE 802.11 RF interface.

FIG. 2 illustrates a wireless communication system in which a dual radio communication device 200 may communicate with the Bluetooth™ device 110 through a Bluetooth™ RF block 205 and through an IEEE 802.11 RF block 206. Information received from or transmitted to the Bluetooth™ device 110 by the IEEE 802.11 RF block 206 may be communicated within the dual radio device 200 between the higher layer blocks 201 and 202 and/or between the middle layer blocks 203 and 204. Examples of information communicated between the transceivers are detailed later. Note that the functional blocks of the dual radio communication device 200 may be realized using a number of different architectures. Some processing blocks in both the Bluetooth™ transceiver and the IEEE 802.11 transceiver may be realized in common processing units or alternatively in separately dedicated processing units. Some embodiments of the dual radio communication device 200 may use a common antenna and/or a common analog front end to realize the Bluetooth™ RF 205 and IEEE 802.11 RF 206 blocks for example. The Bluetooth™ higher layers block 201 and the IEEE 802.11 higher layers block 202 may also be realized in a common processing core. Any variant architecture that includes both a Bluetooth™ transceiver and an IEEE 802.11 transceiver may benefit from the invention disclosed herein.

As illustrated in FIG. 2, the dual radio communication device 200 may include an IEEE 802.11 wireless local area networking (WLAN) baseband processing block 204 containing one or more fast Fourier transform (FFT) processing blocks that may listen to one or more 20 MHz wide contiguous bands of radio frequencies in the ISM band. (Depending on the sampling rate into and processing rate of the FFT block, a sub-band of or the entire ISM band may be monitored.) The Bluetooth® device 110 may transmit, at least in part, within a portion of the band of radio frequencies on which the IEEE 802.11 transceiver may listen. During communication on an IEEE 802.11 WLAN, e.g. from the IEEE 802.11 device 120 through the IEEE 802.11 RF block 206 via the path 209, the IEEE 802.11 WLAN baseband processing block 204 may compute a set of receive symbols transmitted using an orthogonal frequency division multiplexing (OFDM) method. In the absence of an IEEE 802.11 transmission via the path 209, the IEEE 802.11 WLAN baseband processing block 204 may compute the presence of other signals within the same set of frequencies normally occupied by a set of OFDM symbols, e.g. transmissions from the Bluetooth® device 110 through the IEEE 802.11 RF transceiver 206 via the path 207.

Two different reception embodiments may be considered for a dual radio communication device 200 that includes both an IEEE 802.11 transceiver and a Bluetooth™ transceiver. In a first reception embodiment, the IEEE 802.11 baseband processing block 204 may detect the presence of a Bluetooth™ inquiry message transmitted by the Bluetooth™ device 110 through path 207 and may alert the Bluetooth™ transceiver on which frequencies to decode the Bluetooth™ inquiry message. The IEEE 802.11 baseband processing block 204 may alert the Bluetooth™ transceiver by communicating directly with the Bluetooth™ baseband/link layer block 203 or may communicate through the IEEE 802.11 higher layers block 202 and the Bluetooth™ higher layers block 201. In a second reception embodiment, the IEEE 802.11 baseband processing block 204 may both detect and decode a Bluetooth™ inquiry message and then may communicate to the Bluetooth™ transceiver the received inquiry message. In either embodiment, the Bluetooth™ transceiver within the dual radio communication device 200 may respond to the inquiry message by transmitting to the Bluetooth™ device 110 through path 208. Details of the embodiments are described below.

In the first reception embodiment, the output of an FFT processing block in the IEEE 802.11 baseband/MAC layer block 204 may consist of a set of complex values, each complex value associated with a different radio frequency sub-channel spread across a bandwidth of 20 MHz in the ISM band. The number of different frequency sub-channels may depend on the size of the FFT; e.g. an IEEE 802.11 baseband processor may calculate a set of complex values for 64 frequency sub-channels spaced 312.5 kHz apart based on a set of time samples received during a 4 micro-second interval. As a Bluetooth™ inquiry or page message extends for 68 micro-seconds on a single carrier frequency, the IEEE 802.11 baseband/MAC layer block 204 may have sufficient time to detect the presence of the Bluetooth™ inquiry or page message by processing one or more sets of time samples received during one or more 4 micro-second intervals.

Note that Bluetooth™ carrier frequencies may be spaced 1 MHz apart, so a Bluetooth™ transceiver's single frequency energy in one 1 MHz frequency channel may appear in more than one of the IEEE 802.11 baseband/MAC layer block's frequency sub-channels spaced 312.5 kHz apart output by the FFT processing block. In some embodiments, the processing rate and size of an FFT processing block may be flexible, enabling values to be set to match those of Bluetooth transceivers. For example, using a 128 point FFT with an input sample rate of 128 MHz may result in a set of 128 complex values every 1 μsec, i.e. at 1 MHz, matching the symbol rate of a Bluetooth™ transceiver. In this case, a Bluetooth™ transceiver's single frequency energy in one 1 MHz frequency channel may appear primarily in one of the frequency sub-channels spaced 1 MHz apart output by an FFT processing block.

Additionally, Bluetooth® transceivers may use Gaussian Frequency Shift Keying (GFSK) modulation in which the Bluetooth® carrier frequency may be shifted by at least +115 kHz from a nominal frequency for a binary one and by at least −115 kHz from the nominal frequency for a binary zero at a rate of 1 MHz, i.e. every one micro-second a new bit may be transmitted. Using an energy threshold detector that estimates the presence or absence of a signal on the set of frequencies output from the FFT processing block, an 802.11 baseband/MAC layer block 204 may determine on which frequency the Bluetooth® device 110 may be transmitting an inquiry message, distinguishing the Bluetooth® signal from background noise. With additional processing as described below, an output from an FFT processing block may also be used to estimate the bit pattern of an inquiry message sent by the Bluetooth® device 110.

Figure 3:
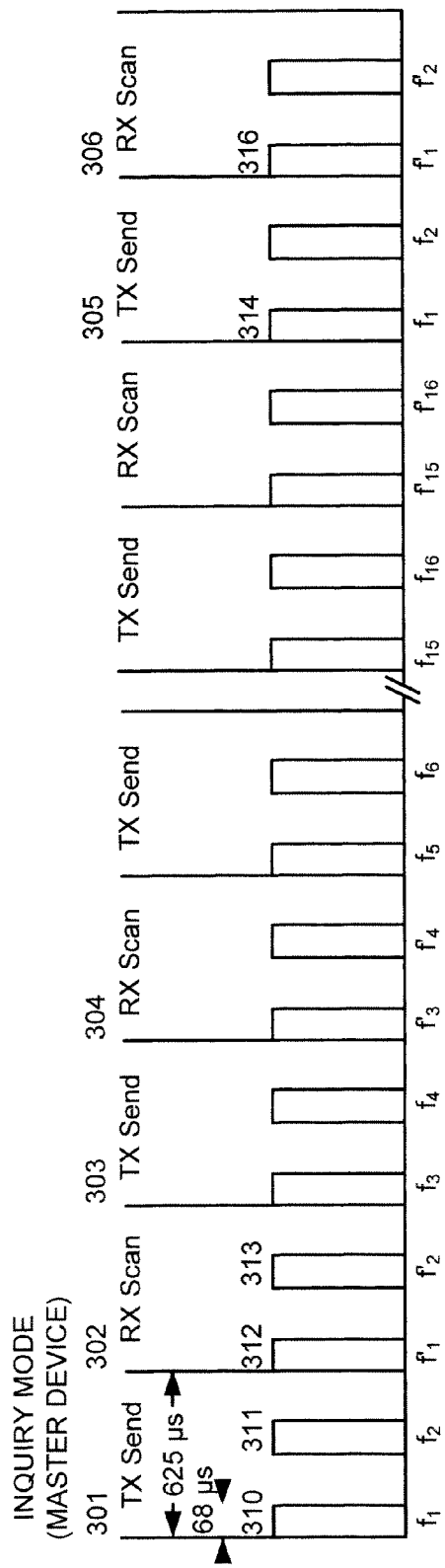
FIG. 3 illustrates a set of time slots for inquiry messaging in a Bluetooth™ piconet.

As illustrated in FIG. 3, a Bluetooth™ system may divide transmissions into a series of transmit (TX) master-to-slave time slots and receive (RX) slave-to-master time slots each time slot extending 625 micro-seconds. Note that the timeslots in FIG. 3 are labeled TX or RX from the point of view of the master (inquiring) device. During a first time slot 301, an inquiring (master) device may send an inquiry message consisting of a 68 bit inquiry access code at a rate of 1 Mbit/sec for a first 68 micro-second interval 310 on a first frequency $f_1$ during a first portion of the first time slot 301 and then may repeat the inquiry message for a second 68 micro-second interval 311 on a second frequency $f_2$ during a second portion of the first time slot 301. During a second time slot 302 immediately following the first time slot 301, an inquiry scanning (slave) device may respond to the inquiry message by sending an inquiry response message during a 68 micro-second interval 312 on a first response frequency $f'_1$ or during a second interval 313 on a second response frequency $f'_2$. If the inquiring (master) device does not receive an inquiry response message during the second time slot 302, then the inquiring (master) device may repeat the same inquiry message during a third time slot 303 modulating a third frequency $f_3$ and a fourth frequency $f_4$. If the inquiry scanning (slave) device responds during a fourth time slot 304, then the inquiry scanning (slave) device may send an inquiry response message modulating a third response frequency $f'_3$ or a fourth response frequency $f'_4$.

The inquiry and inquiry response frequency hopping sequences used by the inquiring (master) device and the inquiry scanning (slave) device respectively may be in part determined by a general inquiry access code (GIAC) transmitted in the inquiry message. As such, the inquiry scanning (slave) device may need to decode the inquiry message before responding to the inquiring (master) device, as the inquiry scanning (slave) device may not know a priori the inquiry response frequency hopping sequence. Knowing which frequency on which the inquiring (master) device transmitted an inquiry message alone may be insufficient to determine the inquiry response frequency hopping sequence. The inquiring (master) device may also transmit a dedicated inquiry access code (DIAC), rather than a GIAC, to which only certain slave devices may respond. The inquiry scanning (slave) device may detect which frequency on which the inquiring (master) device transmitted an inquiry message, but the inquiry scanning (slave) device may not know whether to respond without decoding the inquiry message.

To conserve power consumption, e.g. in a battery operated version of the dual radio device 200, a Bluetooth® transceiver may be in "sleep mode" awaiting the presence of an inquiry message. In order to "waken" the Bluetooth® transceiver to capture and decode the inquiry message, the IEEE 802.11 baseband processor 204 may detect the inquiry message during the first few micro-seconds of receiving the inquiry message, e.g. based on energy received from the first few bits of the 68 bit long inquiry message in a number of receive frequencies output by the FFT processing block. The IEEE 802.11 transceiver may alert the Bluetooth® transceiver on which frequency to begin receiving the inquiry message by communicating between the middle layer blocks 204 and 203 or between the higher layer blocks 202 and 201. As the Bluetooth® transceiver may "sleep" during a number of micro-seconds of the inquiry message, the IEEE 802.11 baseband processor 204 may provide a set of time domain samples that include at least a period from the beginning of the inquiry message to a point when the Bluetooth® transceiver begins receiving and sampling the inquiry message through its Bluetooth® RF block 205. Preferably the set of time domain samples may be formatted to minimize calculations required by the Bluetooth® transceiver to decode the inquiry message. Thus a first portion of a Bluetooth® inquiry message may be received from the Bluetooth® device 110 through the IEEE 802.11 RF block 206 via path 207 and a second portion of the same Bluetooth® inquiry message may be received through the Bluetooth® RF block 205 via path 208.

In the second reception embodiment of the invention, the IEEE 802.11 baseband processing block 204 may calculate an FFT sufficiently quickly that each one micro-second long bit of a 68 micro-second inquiry message may be detected and decoded as a "one" or a "zero" individually. The FFT processing block in the IEEE 802.11 baseband processing block 204 may output a set of complex values every one micro-second rather than every four micro-seconds. With such a quick FFT, the IEEE 802.11 baseband processing block 204 may determine both a carrier frequency used by the Bluetooth™ device 110 for transmitting the inquiry message and the inquiry access code, i.e. the actual 68 bit transmitted sequence. The IEEE 802.11 baseband processing block 204 may then transmit the received inquiry message and the determined carrier frequency to the Bluetooth™ transceiver. The Bluetooth™ transceiver may respond to the inquiry message in a subsequent receive scan time slot on an appropriate carrier frequency based on the information provided by the IEEE 802.11 baseband processing block 204. For example a Bluetooth™ inquiry scanning device may respond on carrier frequency $f'_1$ in time slot 302 after receiving a decoded inquiry access code from the IEEE 802.11 baseband processing block 204 during time slot 301. Alternatively a Bluetooth™ inquiry scanning device may confirm a decoded inquiry access code provided by the IEEE 802.11 baseband processing block 204 during a first portion of time slot 301 by listening to receive the same inquiry access code on frequency $f_2$ during a second portion of time slot 301 before responding to the inquiry message in time slot 302 on either frequency $f'_1$ or frequency $f'_2$.

Figure 4:
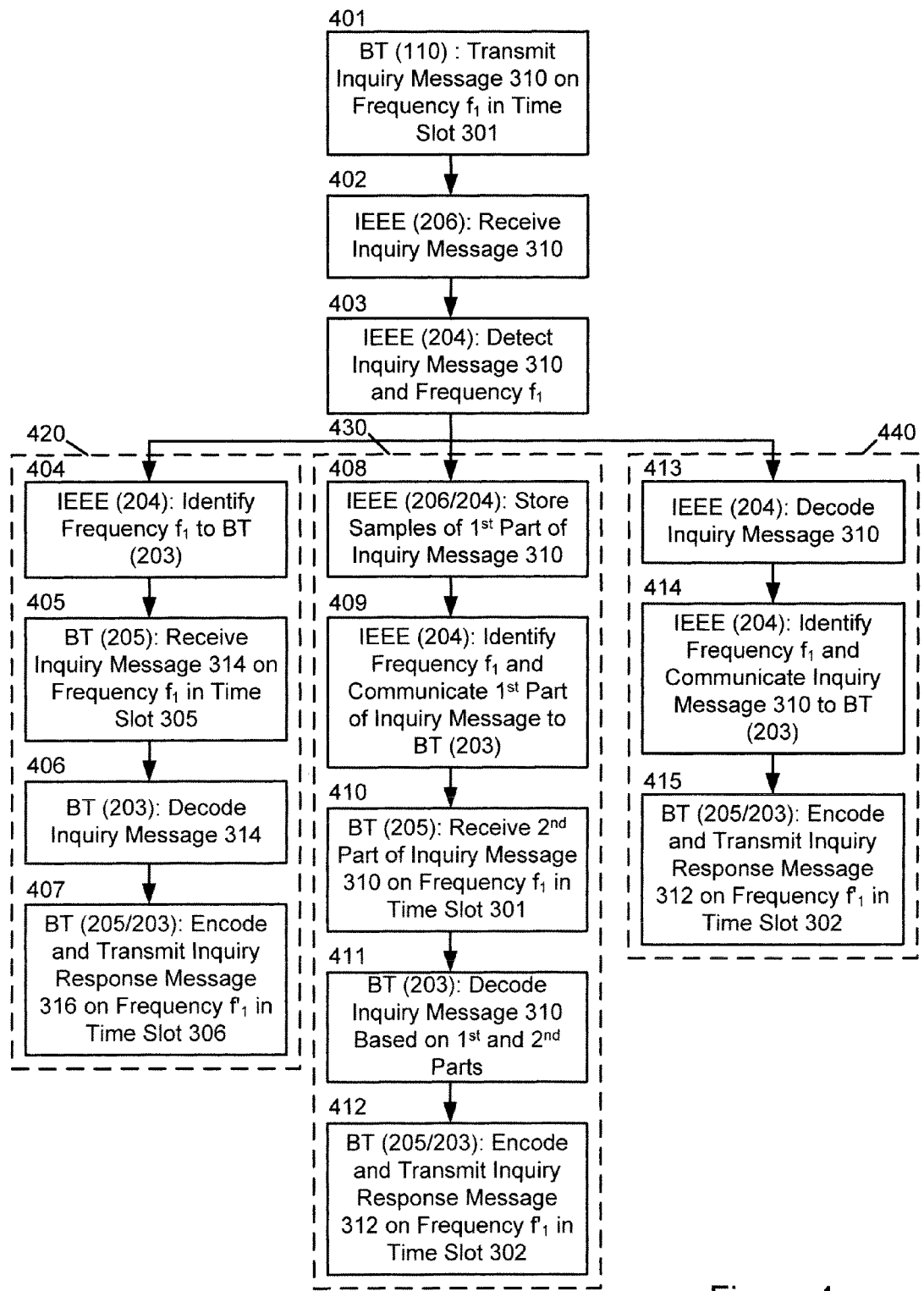
FIG. 4 illustrates a flowchart for receiving a Bluetooth™ inquiry message through an IEEE 802.11 RF interface and responding through a Bluetooth™ RF interface.

FIG. 4 illustrates a flowchart of several exemplary method steps of the invention indicating the operations and interactions of the computational blocks of the devices in FIG. 2 following a portion of the inquiry messaging sequence of FIG. 3. Starting at the top of the flowchart in step 401, the Bluetooth® device 110 may transmit an inquiry message 310 on carrier frequency $f_1$ in time slot 301. The IEEE 802.11 RF interface 206 in the dual radio Bluetooth®/IEEE 802.11 device 200 may receive at least a portion of the inquiry message 310 (402). The IEEE 802.11 Baseband/MAC layer 204 may detect the inquiry message 310 and may identify the carrier frequency $f_1$ on which the message was transmitted (403). Following step 403 in FIG. 4, the method may proceed along one of three different branches as outlined by the dashed boxes 420 (left column), 430 (center column) and 440 (right column). Each branch of the method may advantageously allow portions of the dual radio communication device 200 configured to process WLAN signals to assist in the processing of Bluetooth® signals.

In the left column 420 starting in step 404, the IEEE 802.11 Baseband/MAC layer 204 may identify the carrier frequency $f_1$ to the Bluetooth® Baseband/Link layer 203, either directly or through the higher layers 202 and 201. The Bluetooth® RF block 205 may awaken and may listen for a subsequent inquiry message on carrier frequency $f_1$, receiving an inquiry message 314 in time slot 305 (405). Note that the Bluetooth® RF block 205 after waking up may have missed a first portion of the inquiry message 310 in time slot 301, thus the Bluetooth® RF block 205 may wait for the next inquiry message 314 transmitted on the carrier frequency $f_1$ which may occur in time slot 305. The Bluetooth® Baseband/Link Layer 203 may decode the received inquiry message 314 and may respond by transmitting an inquiry response message 316 by modulating carrier frequency $f'_1$ in time slot 306 (406, 407).

Figure 5:
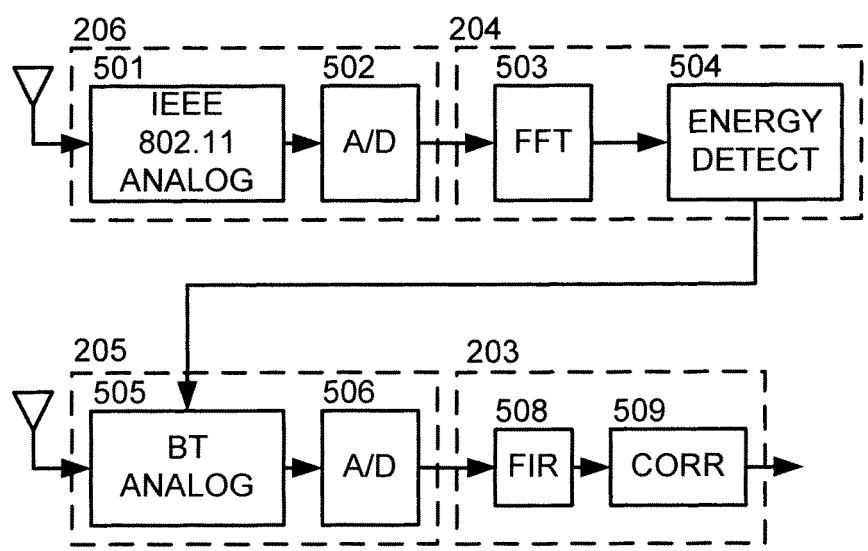
FIG. 5 illustrates signal processing blocks in a dual wireless radio device receiving signals for a Bluetooth™ device through an IEEE 802.11 RF interface and a Bluetooth™ interface.

FIG. 5 illustrates an exemplary embodiment of select processing blocks in a dual radio device that may implement the method illustrated in the left column 420 of FIG. 4. Inside the IEEE 802.11 RF block 206, an IEEE 802.11 analog front end 501 may receive from an antenna Bluetooth™ signals that may be sampled by an ND converter 502 before being transformed by an FFT block 503 in the IEEE 802.11 baseband/MAC layer block 204. The output of the FFT block 503 may provide a set of complex values for a set of frequencies to an energy detection block 504, which may determine if a Bluetooth™ inquiry message has been received on a particular frequency. The frequency detected may then be communicated to a Bluetooth™ analog front end 505 within the Bluetooth™ RF block 205 indicating on which frequency channel the Bluetooth™ transceiver may receive a message. A received digital signal output from an Analog to Digital converter 506 in the Bluetooth™ RF block 205 may be processed by a finite impulse response (FIR) filter 508 and then by a correlation block 509 in the Bluetooth™ baseband/MAC layer block 203 to detect a Bluetooth™ inquiry message. Note that while FIG. 5 illustrates an IEEE 802.11 analog front end 501 that may use 20 or 40 MHz of bandwidth, the same device may use a modified analog front end with wider analog filters and higher ND sampling to cover a wider bandwidth, for example 128 MHz that may span the entire ISM band. The energy detection block 504 may also determine if one or more Bluetooth™ inquiry message have been received on one or more frequencies rather than just the one frequency described in FIG. 4 and shown in FIG. 5. Multiple frequencies may be communicated by the energy detection block 504 to the Bluetooth™ baseband/link layer block 203 so that the Bluetooth™ transceiver may look for inquiry messages on one or more frequencies.

A second method may follow the center column 430 of FIG. 4. Starting in step 408, the IEEE 802.11 Baseband/MAC layer 204 may store a set of time domain samples received by the IEEE 802.11 RF block 206 that may include a first part of the received inquiry message 310. The IEEE 802.11 Baseband/MAC layer 204 may identify the detected carrier frequency $f_1$ and may communicate the saved time domain samples to the Bluetooth® Baseband/Link Layer block 203 (409). The Bluetooth® RF block 205 may awaken and receive a second part of the inquiry message 310 on carrier frequency $f_1$ in time slot 301 (410). The Bluetooth® Baseband/Link Layer block 203 may decode the inquiry message 310 by combining the first part of the received inquiry message 310 based on the saved time domain samples received through the IEEE 802.11 RF block 206 and the second part of the received inquiry message 310 received through the Bluetooth® RF block 205 (411). The Bluetooth® Baseband/Link Layer 203 may respond to the inquiry message 310 by transmitting an inquiry response message 312 on carrier frequency $f'_1$ in time slot 302 (412).

Figure 6:
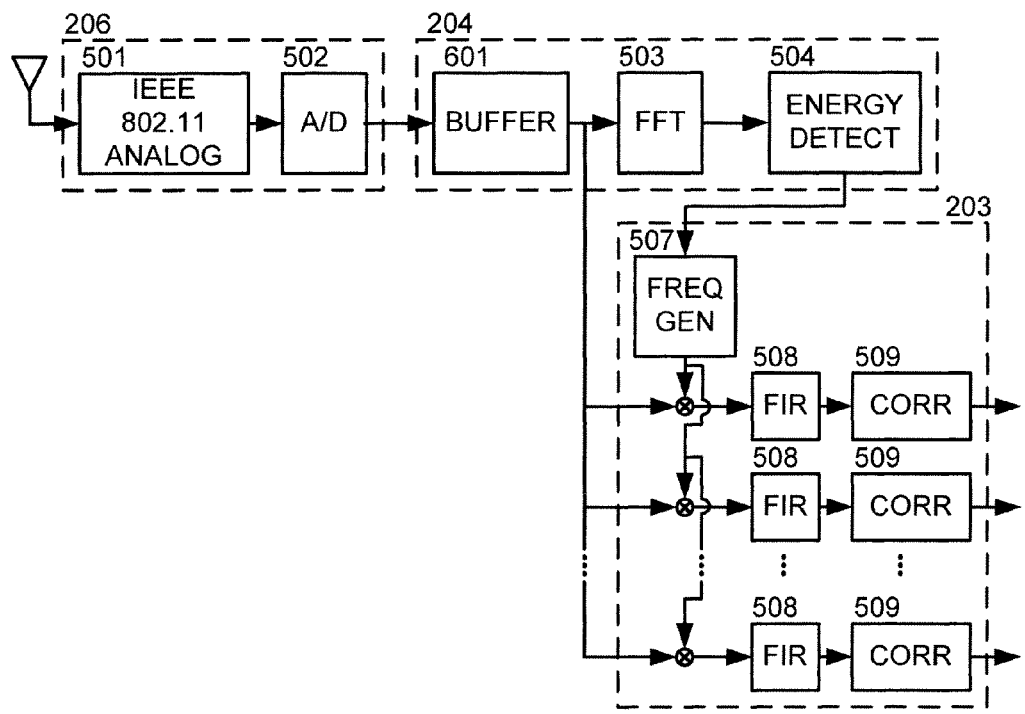
FIG. 6 illustrates signal processing blocks in a dual wireless radio device receiving signal through an IEEE 802.11 RF interface and processing multiple Bluetooth™ correlations in the time domain.

FIG. 6 illustrates an exemplary embodiment of select processing blocks in a dual radio device that may implement the method illustrated in the center column 430 of FIG. 4. As in FIG. 5, the IEEE 802.11 analog front end 501 in the IEEE 802.11 RF block 206 may receive a Bluetooth™ signal from an antenna, and a digitally sampled version of the Bluetooth™ signal may be input to the FFT block 503 in the IEEE 802.11 Baseband/MAC layer block 204. As the FFT block 503 may transform a set of samples in parallel, a buffer 601 may store a set of inputs before the FFT processing, and a subset of these stored inputs may also be transmitted to the Bluetooth™ baseband/link layer block 203 and combined with a digital frequency signal therein. A frequency generator block 507 in the Bluetooth™ baseband/link layer block 203 may generate the digital frequency signal based on information communicated from the energy detection block 504 in the IEEE 802.11 baseband/MAC layer block 204. Note that multiple frequencies may be detected by the energy detection block 504, and multiple Bluetooth™ frequencies may be filtered and correlated in parallel in the Bluetooth™ baseband/link layer block 203 using a bank of FIR filters 508 and correlation blocks 509. In this manner, the Bluetooth™ transceiver in a dual radio device 200 may detect inquiry messages simultaneously from multiple Bluetooth™ devices that each may transmit on different frequency channels. This parallel processing may speed the completion of an inquiry procedure between a Bluetooth™ master (inquiring) device and multiple Bluetooth™ slave (inquiry scanning) devices.

A third method may follow the right column 440 of FIG. 4. Starting in step 413, the IEEE 802.11 Baseband/MAC layer 204 may decode the received inquiry message 310. The IEEE 802.11 Baseband/MAC layer 204 may identify the detected carrier frequency $f_1$ and may communicate the received decoded inquiry message 310 to the Bluetooth® Baseband/Link Layer block 203 (414). The Bluetooth® Baseband/Link Layer 203 may respond to the inquiry message 310 by transmitting an inquiry response message 312 by modulating the carrier frequency $f'_1$ in time slot 302 (415).

Figure 7:
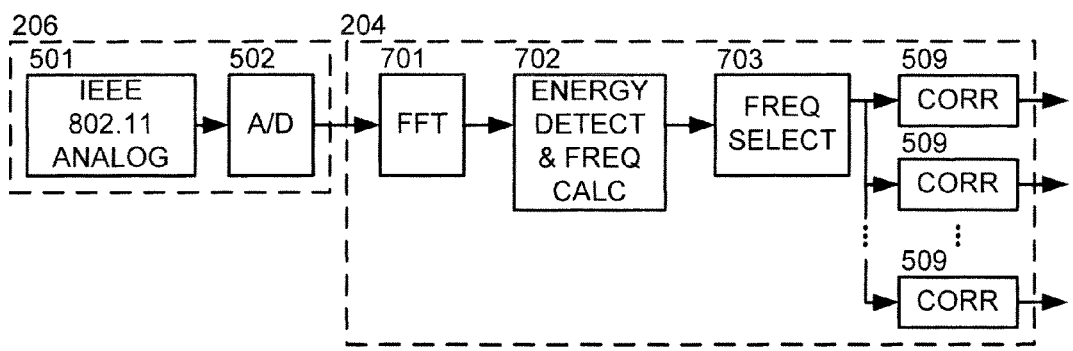
FIG. 7 illustrates signal processing blocks in a dual wireless radio device receiving signals through an IEEE 802.11 RF interface and processing multiple correlations in the frequency domain.

FIG. 7 illustrates an exemplary embodiment of select processing blocks in a dual radio device that may implement the method illustrated in the right column 440 of FIG. 4. In this embodiment, Bluetooth™ messages may be detected and decoded on one or more frequency sub-channels using blocks in the IEEE 802.11 Baseband/MAC layer 204. Each Bluetooth™ symbol may occupy a time span of one µsec, and a 128 point FFT transforming a set of samples from a 128 MHz sampling Analog to Digital converter may result in one complex value per frequency sub-channel spaced 1 MHz apart across a 128 MHz bandwidth. Other A-to-D sampling rates and FFT sizes may also be used that result in frequency sub-channels spaced 1 MHz apart, for example a 64 point FFT transforming a set of samples from a 64 MHz sampling A-to-D converter. While these frequency domain samples may provide enough information for energy detection, as described for FIGS. 5 and 6, additionally calculating the actual positive or negative frequency shift of the Bluetooth™ frequency carrier to determine the bit value may require additional processing. An FFT frame of 128 samples input to a 128 point FFT may not align with a transmitted Bluetooth™ symbol boundary, and thus an FFT block 701 may transform together part of one transmitted Bluetooth™ symbol and part of a subsequently transmitted Bluetooth™ symbol.

In an embodiment of the invention, the FFT block 701 may operate at least at twice the processing rate compared with the sample rate of the Analog to Digital converter 502, computing at least two FFT transforms for each Bluetooth™ symbol (bit) period of one µsec. One FFT transform may be shifted by one half of a Bluetooth™ symbol period with respect to the other FFT transform. For example the FFT block 701 may transform a set of samples {x[0], x[1], ..., x[127]} followed by a set of samples {x[64], x[65], ..., x[191]} followed by a set of samples {x[128], x[129], ..., x[255]}, etc. thereby using each sample from the Analog to Digital converter 502 twice. One of the transforms may contain at least ¾ of one Bluetooth™ symbol together with at most ¼ of a second Bluetooth™ symbol, which may provide sufficient information to decode which bit was transmitted. The GFSK modulation method used by the Bluetooth™ standard may encode a "one" as a positive shift in frequency and a "zero" as a negative shift in frequency. As the FFT block 701 may integrate the frequency change over time in its FFT transform, a "one" bit value may still result in a positive phase shift on the associated frequency sub-channel output from the FFT block 701, while a "zero" may still result in a negative phase shift, even if the next Bluetooth™ symbol, of which part may be transformed together with the current Bluetooth™ symbol, may encode a different bit value. Operating the FFT block 701 at twice the Analog to Digital converter 502 sampling rate provides sufficient information to decode the GFSK modulated Bluetooth™ symbols; higher rates such as three or four times the sampling rate or more may also be used.

A set of samples output from the FFT block 701 may be processed by an energy detection and frequency calculation block 702. Of the 128 frequency sub-channels spaced 1 MHz apart, up to 79 frequency sub-channels may contain information from a Bluetooth™ message in general, but up to only 32 frequency sub-channels may contain information for Bluetooth™ inquiry (or page) messages. The energy detection and frequency calculation block 702 may process only a subset of all of the FFT block 701 outputs to minimize computations. For each frequency sub-channel on which energy may be detected, the quantity $\text{sign}(x[n] \cdot \text{conj}(x[n-2]))$ may be computed by the energy detection and frequency calculation block 701 to determine the frequency and thereby the bit received on that frequency sub-channel. The calculation may be performed twice, once for each FFT "phase", and the best result may be used. A set of resulting demodulated bits may be transferred through a frequency selection block 703 that may route the results to a bank of correlation blocks 509. Each correlation block 509 may determine whether a particular bit pattern may be received on a particular frequency sub-channel. The frequency sub-channel associated with each correlation block 509 may be changed based on which frequency sub-channels are detected in the energy detection and frequency calculation block 702. A Bluetooth™ message detected by a correlation block 509 may be transmitted, along with the associated frequency sub-channel, to the Bluetooth™ baseband/link layer 203 as indicated in step 414 of FIG. 4.

Each of the three methods illustrated in FIG. 4 may offer varying options to balance processing capabilities in the Bluetooth™ and IEEE 802.11 blocks of the dual radio Bluetooth™/IEEE 802.11 device 200. The left column 420 method may require minimal computations by the IEEE 802.11 Baseband/MAC layer block 204 but may take longer for the Bluetooth™ Baseband/Link layer block 203 to respond to the inquiry message 310. This delay may be due to waiting to receive the second inquiry message 314 before responding. The center column 430 method may require some additional computations for the Bluetooth™ Baseband/Link layer block 203 to combine time samples from the IEEE 802.11 RF block 206 and the Bluetooth™ RF block 205 to receive the inquiry message 310; however, the Bluetooth™ Baseband/Link layer block 203 may respond more quickly than using the left column 420 method. The right column 440 method may require more computations by the IEEE 802.11 Baseband/MAC layer block 204 to decode the inquiry message 310, but the Bluetooth™ Baseband/Link Layer block 203 may respond quickly to the inquiry message 310 with minimal computations. Other variant embodiments of the invention may be possible in addition to those illustrated in FIG. 4.

As described above for inquiry messages, the invention may apply also to detecting and decoding page messages transmitted by a Bluetooth™ paging (master) device and responded to by a Bluetooth™ page scanning (slave) device. Page messages may consist of a 68 bit sequence transmitted using a page frequency hopping sequence in the same time slotted format as indicated for inquiry messages in FIG. 3. An IEEE 802.11 baseband processing block 204 in a dual radio IEEE 802.11/Bluetooth™ device 200 may listen for Bluetooth™ page messages, may detect carrier frequencies on which such page messages are transmitted and may decode such page messages as described above for inquiry messages. Bluetooth™ page messages may differ from Bluetooth™ inquiry messages by their specific bit sequence and by the frequency hopping sequence used.

As described above for receiving Bluetooth™ messages on multiple frequency sub-channels, dual radio devices 200 that include both a Bluetooth™ transceiver and an IEEE 802.11 transceiver may also transmit on multiple frequency sub-channels. A wider bandwidth transceiver, such as an IEEE 802.11 transceiver, may transmit Bluetooth™ messages across a range of frequencies simultaneously and may shorten inquiry and page scan procedures that establish and maintain connections in a Bluetooth™ network. An IEEE 802.11 radio transceiver in the dual radio device 200 may transmit the same Bluetooth™ message on multiple Bluetooth™ 1 MHz wide radio frequency channels simultaneously, thus increasing the probability that the Bluetooth™ transceiver 110 that may listen on only a single 1 MHz wide radio frequency channel at a time may detect an inquiry or page message successfully in a shorter time.

Figure 8:
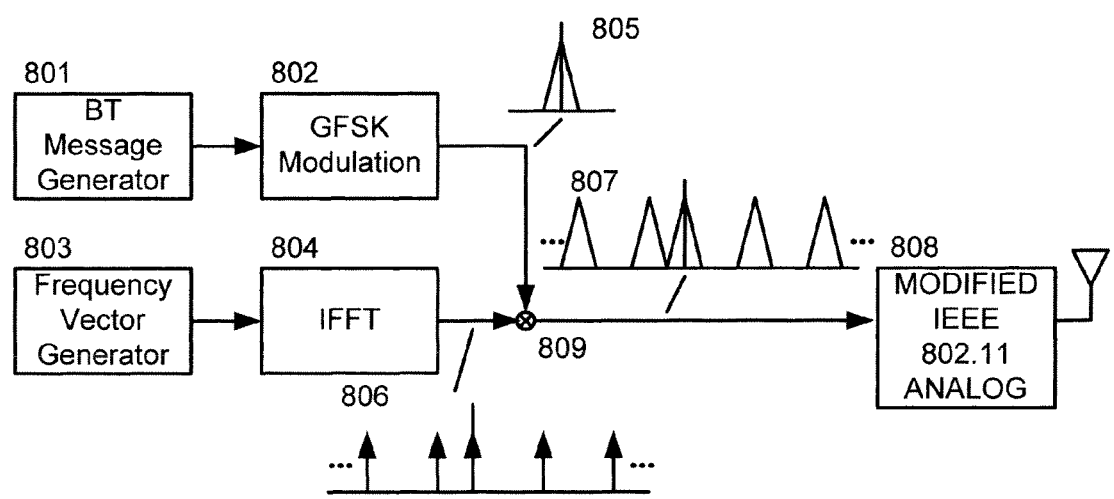
FIG. 8 illustrates signal processing blocks in a dual wireless radio device transmitting Bluetooth™ signals on multiple sub-carriers through a modified IEEE 802.11 RF interface.

FIG. 8 illustrates an example of how a Bluetooth™ message may be replicated across multiple frequency channels using the IFFT of a modified IEEE 802.11 transceiver. A Bluetooth™ message generator 801 may output a bit value at a 1 MHz rate to a Gaussian Frequency Shift Key (GFSK) modulation block 802 that may produce a Bluetooth™ bit pulse each 1 µsec. The power spectrum of that bit pulse may be illustrated by the graph 805. A frequency vector generator 803 may input a vector of 128 ones and zeroes to a 128 point inverse Fast Fourier Transform (IFFT) block 804 that may produce a transformed set of outputs every 1 µsec. The block 804 may output a set of sinusoids (sub-carriers) at different frequencies, where frequency sub-carriers with a "one" input may contain a non-zero energy sinusoid, while frequency sub-carriers with a "zero" input may contain no energy. The power spectrum of the output of the IFFT 804 may be a series of impulses spaced 1 MHz apart as indicated in graph 806. Combining the output of the IFFT 804 with the output of the GFSK modulation block 802 using a mixer 809 may result in a signal with a power spectrum that replicates the Bluetooth™ bit pulse on each of the different frequency sub-carriers as shown in graph 807. The combined signal may then be processed through a wideband analog front end, such as a modified 802.11 IEEE analog block 808, for transmission through an antenna to multiple Bluetooth™ devices (not shown) simultaneously.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A dual radio wireless communication device comprising:
 a first wireless transceiver conforming to a first communication protocol and a second wireless transceiver conforming to a second communication protocol;
 wherein the first communication protocol uses a series of frequency channels, one frequency channel at a time, from a set of frequency channels, and the second communication protocol uses a plurality of frequency sub-channels in parallel from a set of frequency sub-channels,
 and further wherein, the first wireless transceiver is configured to receive a communication message via the one at a time frequency channel, and the second wireless transceiver is configured to transmit a response to the communication message by replicating a power spectrum of the response to the communication message conforming to the first communication protocol on one or more frequency sub-channels,
 and yet further wherein, the second wireless transceiver comprises:
 a Gaussian Frequency Shift Key (GFSK) modulation block controlled by the response to the communication message;
 an inverse Fast Fourier Transform (IFFT) block used to create a carrier frequency spectrum conforming to the first communication protocol; and
 a mixer for combining outputs of the GFSK modulation block and the IFFT block.

2. The device of claim 1, wherein the first communication protocol is a frequency hopping spread spectrum protocol and the second communication protocol is an orthogonal frequency division multiplexing protocol.

3. The device of claim 1, wherein the first communication protocol is a Bluetooth® protocol and the second communication protocol is an IEEE 802.11 wireless protocol.

4. The device of claim 1, wherein the second wireless transceiver is configured to transmit the response to the communication message concurrently on at least two frequency sub-channels in the set of frequency sub-channels.

5. The device of claim 3, wherein the IEEE 802.11 wireless protocol is used to replicate the response to the communication message to at least two Bluetooth® devices via separate sub-channels in the set of frequency sub-channels.

6. The device of claim 1, wherein the communication message is an inquiry message.

7. The device of claim 1, wherein the communication message is a page message.

8. A method for operating a dual radio wireless communication device, comprising:
 receiving a communication message using a first wireless transceiver conforming to a first communication protocol that uses a series of frequency channels, one at a time, from a set of frequency channels; and
 transmitting a response to the communication message using a second wireless transceiver conforming to a second communication protocol that uses a plurality of frequency sub-channels in parallel from a set of frequency sub-channels, said transmitting including replicating a power spectrum of the response to the communication message conforming to the first communication protocol on one or more frequency sub-channels, wherein said replicating the power spectrum comprises:
controlling a Gaussian Frequency Shift Key (GFSK) modulation block by the response to the communication message;
using an inverse Fast Fourier Transform (IFFT) block to create a carrier frequency spectrum conforming to the first communication protocol;
combining outputs of the GFSK modulation block and the IFFT block; and
controlling the second wireless transceiver to wirelessly transmit the combined outputs.

9. The method of claim 8, wherein the first communication protocol is a frequency hopping spread spectrum protocol and the second communication protocol is an orthogonal frequency division multiplexing protocol.

10. The method of claim 8, wherein the first communication protocol is a Bluetooth® protocol and the second communication protocol is an IEEE 802.11 wireless protocol.

11. The method of claim 8, wherein the second wireless transceiver transmits the response to the communication message concurrently on at least two frequency sub-channels in the set of frequency sub-channels.

12. The method of claim 10, wherein the IEEE 802.11 wireless protocol is used to replicate the response to the communication message to at least two Bluetooth® devices via separate sub-channels in the set of frequency sub-channels.

13. The method of claim 8, wherein the communication message is an inquiry message.

14. The method of claim 8, wherein the communication message is a page message.

15. A non-transitory, computer-readable medium storing computer-executable instructions for a dual radio wireless communication device, the instructions when executed by a processor cause the processor to execute a process comprising:
receiving a communication message using a first wireless transceiver conforming to a first communication protocol that uses a series of frequency channels, one at a time, from a set of frequency channels; and
transmitting a response to the communication message using a second wireless transceiver conforming to a second communication protocol that uses a plurality of frequency sub-channels in parallel from a set of frequency sub-channels, said transmitting including replicating a power spectrum of the response to the communication message conforming to the first communication protocol on one or more frequency sub-channels,
wherein said replicating the power spectrum comprises:
controlling a Gaussian Frequency Shift Key (GFSK) modulation block by the response to the communication message;
using an inverse Fast Fourier Transform (IFFT) block to create a carrier frequency spectrum conforming to the first communication protocol;
combining outputs of the GFSK modulation block and the IFFT block; and
controlling the second wireless transceiver to wirelessly transmit the combined outputs.

16. The computer-readable medium of claim 15, wherein the first communication protocol is a frequency hopping spread spectrum protocol and the second communication protocol is an orthogonal frequency division multiplexing protocol.

17. The computer-readable medium of claim 15, wherein the first communication protocol is a Bluetooth® protocol and the second communication protocol is an IEEE 802.11 wireless protocol.

18. The computer-readable medium of claim 15, wherein the second wireless transceiver transmits the response to the communication message concurrently on at least two frequency sub-channels in the set of frequency sub-channels.

19. The computer-readable medium of claim 17, wherein the IEEE 802.11 wireless protocol is used to replicate the response to the communication message to at least two Bluetooth® devices via separate sub-channels in the set of frequency sub-channels.

20. The computer-readable medium of claim 15, wherein the communication message is an inquiry message.

21. The computer-readable medium of claim 15, wherein the communication message is a page message.

22. A method for operating a dual radio wireless communication device, comprising:
receiving a communication message using a first wireless transceiver conforming to a Bluetooth® protocol; and
transmitting a response to the communication message using a second wireless transceiver conforming to an IEEE 802.11 wireless protocol by replicating a power spectrum of the response to the communication message conforming to the Bluetooth® protocol on one or more frequency sub-channels of IEEE 802.11 sub-channels,
wherein said replicating the power spectrum comprises:
controlling a Gaussian Frequency Shift Key (GFSK) modulation block by the response to the communication message;
using an inverse Fast Fourier Transform (IFFT) block to create a carrier frequency spectrum conforming to the Bluetooth® protocol;
combining outputs of the GFSK modulation block and the IFFT block; and
controlling the second wireless transceiver to wirelessly transmit the combined outputs.

23. The method of claim 22, wherein the IEEE 802.11 wireless protocol is used to replicate the response to the communication message to at least two Bluetooth® devices via separate IEEE 802.11 sub-channels.

24. The method of claim 22, wherein using the IFFT block to create a carrier frequency spectrum further comprises:
selecting which IEEE 802.11 sub-channels shall be used to transmit; and
transmitting the outputs conforming to the Bluetooth® protocol on those sub-channels.

25. The method of claim 24, further comprising at least two sub-channels being selected.

* * * * *